April 8, 1924.

P. MALCAMP

COFFEE PERCOLATOR

Filed Aug. 11, 1923

1,489,893

Inventor
Philip Malcamp
by F. A. Witherspoon
Attorney

Patented Apr. 8, 1924.

1,489,893

UNITED STATES PATENT OFFICE.

PHILIP MALCAMP, OF NEW ORLEANS, LOUISIANA.

COFFEE PERCOLATOR.

Application filed August 11, 1923. Serial No. 656,773.

*To all whom it may concern:*

Be it known that I, PHILIP MALCAMP, a citizen of France, residing at New Orleans, in the parish of Orleans and State of Louisiana, have invented certain new and useful Improvements in Coffee Percolators; and I do hereby declare, the following to be a full, clear, and exact description of the invention, such .as will .enable others skilled in the art to which it appertains to make and use the same.

This invention relates to coffee percolators and has for its object to provide a device of this character which will be simple in construction and more efficient in its operation than those heretofore proposed.

With these and other objects in view the invention consists in the novel details of construction and combinations of parts as will be more fully disclosed hereinafter and particularly pointed out in the claims.

Referring to the accompanying drawings forming a part of this specification in which like numerals designate like parts in all the views:—

Figure 2:
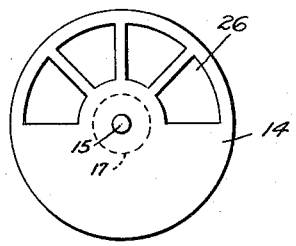
Fig. 2 is a plan view of the apertured drip member 14 shown in Figures 1 and 4.
Figure 3:
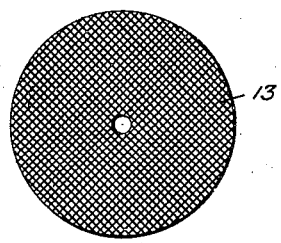
Fig. 3 is a plan view of the screen filter 13 shown in Figs. 1 and 4.
Figure 4:
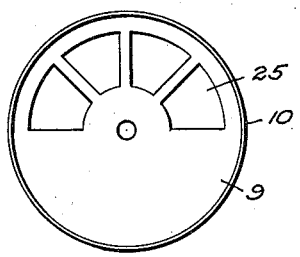
Fig. 4 is a top plan view of the apertured bottom drip member 9 of the percolator.

1 represents a cylindrical receptacle provided with the handles 2, and having at its upper end a reduced neck portion 3 adapted to be fitted with an air tight cover 4. The lower end of the said receptacle 1 is also provided with a reduced collar or neck portion 5 so formed on the cylinder as to provide the inclined wall portion 6, and said neck portion 5 is also threaded to receive the coffee receptacle now to be described.

The coffee receptacle 7 comprises the cylinder 8 which may be threaded at one end to engage the threaded up turned flange 10 of the cup shaped bottom member 9. Said flange 10 may also be provided with screw threads 11 to engage corresponding screw threads 12 on the member 8 as shown. Inside the member 9 is placed the foraminous member 13, and on top of said member 13 is placed the plate member 14. Through the members 9, 13 and 14 passes the holding means 15 provided with the wing nut 16 and holding disk 17 as shown. The member 9 is provided with a plurality of apertures 25 and the plate member 14 is provided with a plurality of similar apertures 26 as illustrated. The ground coffee is represented at 20 and above said coffee is a flanged plate 27 provided with the perforations 28 as shown.

Figure 1:
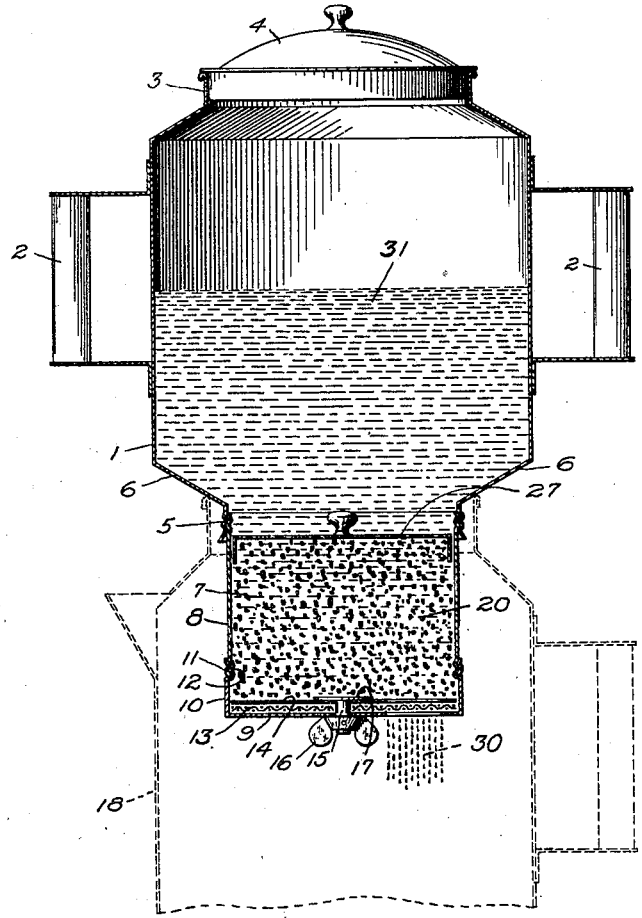
Fig. 1 is a vertical sectional view of a percolator made in accordance with this invention.
Figure 5:
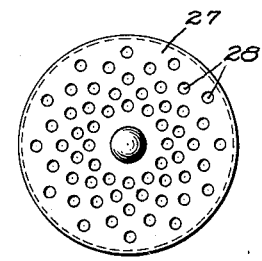
Fig. 5 is a top plan view of the sieve like cover to be placed on top of the coffee grounds in said percolator.
Figure 6:
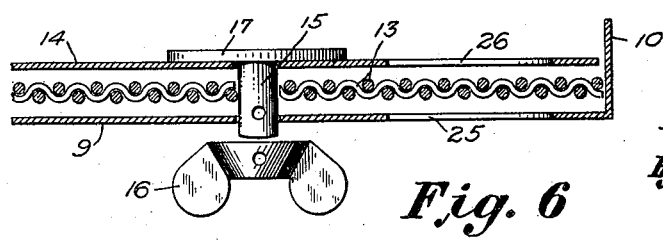
Fig. 6 is an enlarged partial sectional view showing the method of assembling the parts shown in Figs. 2, 3 and 4.

Any suitable receptacle 18, shown in dotted lines, Fig. 1, may be employed to receive the coffee liquor when made.

The operation of this invention is as follows:—The coffee holder 7 is removed from the receptacle 1 as by unscrewing it from the threads 5 and the perforations 25 and 26 are adjusted relatively to each other by turning the plate member 14 around the pivot 15 when the wing nut 16 is tightened to hold the parts in place. The adjustment of the perforations 25 and 26 relatively to each other in the manner disclosed and the tightening of the parts by the means 15 has the effect of regulating the freedom with which the coffee liquor 30 will pass through the perforations 25 into the receptacle 18. Therefore, said adjustment will also regulate the time the water is in contact with the coffee grounds 20, and the strength of the resulting coffee liquor. After said perforations 25 and 26 are thus adjusted, the coffee grounds 20 are placed in the receptacle 7 and the latter is secured by any suitable means to the receptacle 1, as for example, by screwing said receptacle into the threads 5 after the perforated sieve like cover 27 has been pressed down upon said grounds as illustrated in Figure 1, to hold them snugly in place. Preferably boiling hot water 31 is next poured into the receptacle 1, which finds its way down through the member 27, the grounds 20, the member 14, the sieve member 13, and the member 9 into the receptacle 18.

It is obvious that the parts may be made of aluminum or other suitable material, the walls of the entire apparatus may be made of any suitable desired construction, and other obvious changes in the joining of the parts together may be effected, and therefore, it is not desired to be limited to the above disclosure except as may be required by the claims.

What is claimed is:—

1. In a coffee percolator the combination of a perforated lower wall; a sieve like filler member above said wall; an adjustable perforated plate or drip member above said sieve member; means to adjustably hold said wall, said sieve member and said drip member together; a container adapted to hold the ground coffee above said plate member; a foraminous plate adapted to rest upon said coffee grounds; a water receptacle; and means joining said receptacle with said container.

2. In a coffee percolator the combination of a bottom wall having a plurality of perforations; a foraminous member overlying said wall; a drip member having a plurality of perforations overlying said foraminous member; means to hold said wall, said foraminous member and said drip member in such adjustable relations to each other as will vary the outflow of liquid therethrough; a container rigid with said bottom member adapted to hold coffee grounds above said drip member; a flanged perforated member adapted to rest in said container to hold said grounds in place; and a water receptacle open at its bottom adapted to be secured liquid tight to said container.

3. In a coffee percolator the combination of a lower perforated wall provided with a screw threaded flange; a sieve like member overlying said wall; a perforated plate or drip member overlying said sieve member; a screw bolt for holding said parts in an adjustable relation to each other; a container having screw threads adapted to engage said first named screw threads and also adapted to hold ground coffee; a perforated plate adapted to enter said container and overlie said ground coffee to keep it in a compact mass; a hot water container having a reduced open ended bottom portion adapted to be secured liquid tight to said container.

In testimony whereof he affixes his signature.

PHILIP MALCAMP.